(12) United States Patent
Li et al.

(10) Patent No.: US 9,176,995 B2
(45) Date of Patent: Nov. 3, 2015

(54) ORGANIZATION OF DATA WITHIN A DATABASE

(75) Inventors: Tianchao Li, Boeblingen (DE); Peter Bendel, Holzgerlingen (DE); Oliver Draese, Holzgerlingen (DE); Namik Hrle, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 12/946,054

(22) Filed: Nov. 15, 2010

(65) Prior Publication Data

US 2011/0208754 A1   Aug. 25, 2011

(30) Foreign Application Priority Data

Feb. 22, 2010   (EP) .................................... 10154212

(51) Int. Cl.
   *G06F 17/30* (2006.01)
(52) U.S. Cl.
   CPC .... *G06F 17/30286* (2013.01); *G06F 17/30289* (2013.01)
(58) Field of Classification Search
   CPC .................................................. G06F 3/0608
   See application file for complete search history.

(56) References Cited

U.S. PATENT DOCUMENTS

| | | | | |
|---|---|---|---|---|
| 5,546,575 | A * | 8/1996 | Potter et al. ............................ | 1/1 |
| 5,794,229 | A | 8/1998 | French et al. | |
| 6,842,748 | B1 * | 1/2005 | Warner et al. ........................ | 1/1 |
| 7,366,716 | B2 | 4/2008 | Agrawal et al. | |
| 8,019,765 | B2 * | 9/2011 | Povzner et al. ............... | 707/739 |
| 2002/0143743 | A1 * | 10/2002 | Iyer et al. ........................ | 707/1 |
| 2006/0080285 | A1 * | 4/2006 | Chowdhuri ....................... | 707/3 |
| 2007/0061544 | A1 | 3/2007 | Uppala | |
| 2007/0067327 | A1 * | 3/2007 | Cruanes et al. ............... | 707/101 |
| 2007/0288495 | A1 | 12/2007 | Narasayya et al. | |
| 2008/0059412 | A1 | 3/2008 | Tarin | |
| 2008/0168069 | A1 * | 7/2008 | Chang et al. .................. | 707/100 |
| 2009/0019091 | A1 * | 1/2009 | Horvitz et al. ................ | 707/201 |
| 2009/0299973 | A1 * | 12/2009 | Kataoka et al. .................... | 707/3 |

OTHER PUBLICATIONS

Duen-Ren Liu; Partitioning Similarity Graphs; A Framework for Declustering Problems; 2006; Department of Computer Science; University of Minnesota; pp. 1-23.*

Neoklin Polyzotis; Selectivity-Based Partitioning; A Divide-and-Union Paradigm for Effective Query Optimization; ACM ; 2005; pp. 1-8.*

Johnson et al., "Row-wise Parallel Predicate Evaluation", PVLDB; Aug. 23-28, 2008; Auckland, New Zealand; pp. 622-634.

Johnson et al., "Query-Aware Partitioning for Monitoring Massive Network Data Streams", 2008 IEEE; ICDE 2008; pp. 1528-1530.

Harizopoulos et al., "Performance Tradeoffs in Read-Optimized Databases", VLDB; Sep. 12-15, 2006; Seoul, Korea; Copyright 2006 VLDB Endowment, ACM.

Vertica, "The Vertica Analytic Database—Introducing a New Era in DMBS Performance and Efficiency", www.vertica.com.

* cited by examiner

*Primary Examiner* — Apu Mofiz
*Assistant Examiner* — Jermaine Mincey
(74) *Attorney, Agent, or Firm* — Mohammed Kashef; SVL IPLaw Edell, Shapiro & Finnan, LLC (57) ABSTRACT

A computer implemented method is provided for processing data representing a data entity having sub entities. The method includes analyzing queries to the data entity for deriving information about sets of the sub entities frequently queried together, and grouping the sub entities to a number of banks, each bank having a maximum width, based on the information about sets of sub entities frequently queried together, in order to reduce an average number of banks to be accessed for data retrieval.

8 Claims, 3 Drawing Sheets

ORGANIZATION OF DATA WITHIN A DATABASE

BACKGROUND

1. Technical Field

The present invention relates in general to the field of organization of data in a database, such as a computerized method for processing data (e.g., compressed data), representing a data entity having sub entities, and a corresponding computer system. The present invention also relates to a data processing program and a computer program product for processing data.

2. Discussion of the Related Art

A database is a collection of information organized in such a way that a computer program can quickly and efficiently select desired pieces of data. It is known in the art that data are distinct pieces of formatted information. In electronic form, data are bits and bytes stored in electronic memory. Traditional databases are organized by fields, records, and files. A field is a piece of information; a record is one complete set of fields; and a file is a collection of records. To access information from a database, a program in the form of a database management system is employed.

In the PVLDB-Paper "ROW-WISE PARALLEL PREDICATE EVALUATION" by Ryan Johnson et al, PVLDB'08 Aukland, New Zealand, 2008, Aug. 23-28, Pages 622-634, a row-wise parallel predicate evaluation is disclosed. According to the disclosure table scans have become more interesting recently due to greater use of ad-hoc queries and greater availability of multicore, vector-enabled hardware. Table scan performance is limited by value representation, table layout, and processing techniques. Therefore, a new layout and processing technique for efficient one-pass predicate evaluation are proposed. Starting with a set of rows with a fixed number of bits per column, columns are appended to form a set of banks and then each bank is padded to a supported machine word length, typically 16, 32, or 64 bits. Partial predicates on the columns of each bank are then evaluated using an evaluation strategy that evaluates column level equality, range tests, IN-list predicates, and conjuncts of these predicates, simultaneously on multiple columns within a bank, and on multiple rows within a machine register. This approach outperforms pure column stores, which must evaluate the partial predicates one column at a time. The performance and representation overhead of this new approach and several proposed alternatives are evaluated and compared.

BRIEF SUMMARY

The present invention provides a method for processing data, such as compressed data, which is able to achieve faster table scan speed in query processing, and further provides a computer system, a data processing program and a computer program product to perform the method for processing data.

In accordance with an example embodiment of the present invention, a computer implemented method for processing data representing a data entity having sub entities, comprises analyzing queries to the data entity for deriving information about sets of the sub entities frequently queried together, and grouping the sub entities to a number of banks, each bank having a maximum width, based on the information about sets of sub entities frequently queried together, in order to reduce an average number of banks to be accessed for data retrieval.

In accordance with another example embodiment of the present invention, a computer system comprises at least one computer and at least one storage media to store a database, where the at least one computer comprises at least one processing unit configured to process data representing a data entity having sub entities by analyzing queries to the data entity for deriving information about sets of the sub entities frequently queried together, and grouping the sub entities to a number of banks, each bank having a maximum width, based on the information about sets of sub entities frequently queried together, in order to reduce an average number of banks to be accessed for data retrieval.

In accordance with still another example embodiment of the present invention, a computer program product comprises a computer readable storage medium, the computer readable storage medium having a computer readable program code embodied therewith. The computer readable program code is configured to analyze queries to the data entity for deriving information about sets of the sub entities frequently queried together, and group the sub entities to a number of banks, each bank having a maximum width, based on the information about sets of sub entities frequently queried together, in order to reduce an average number of banks to be accessed for data retrieval.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but merely representative of selected embodiments of the invention.

In accordance with an example embodiment of the invention, a computer implemented method for processing data representing a data entity having sub entities, comprises analyzing queries to the data entity for deriving information about sets of the sub entities frequently queried together, and grouping the sub entities to a number of banks, each bank having a maximum width, based on the information about sets of sub entities frequently queried together, in order to reduce an average number of banks to be accessed for data retrieval.

In an example embodiment of the present invention, the maximum width has a size of a CPU register or a word size.

In another example embodiment of the present invention, weight values are assigned to the sets of sub entities according to a weight function; the sets of sub entities are sorted based on the weight values; and sub entities that are present in a set of sub entities having a higher weight value are removed from sets of sub entities having a smaller weight value.

In further example embodiments of the present invention, the weight function increases with total width of the set of sub entities and/or access frequency of the set of sub entities and/or number of sub entities in the set of sub entities and/or processing time of the queries to the data entity comprising the sets of sub entities.

In still further example embodiments of the present invention, the weight function determines an order of the sets of sub entities according to the assigned weight values and an applied packing method is picking up the sets of sub entities according to the order and determines in which bank a current set of sub entities is placed in.

In other example embodiments of the present invention, subsets of sub entities present in at least two sets of sub entities are determined, where the subsets of sub entities are handled as additional sets of sub entities by assigning a weight value to each subset of sub entities.

In still other example embodiments of the present invention, an access frequency of each subset of sub entities is determined as sum of the access frequencies of corresponding sets of sub entities containing the subset.

In further example embodiments of the present invention, sub entities of the data entity not present in any set of sub entities are handled as individual sub entities having a low weight value.

In still further example embodiments of the present invention, sets of sub entities having a width larger than a predetermined threshold value are split in split sets of sub entities, where the split sets of sub entities are handled as additional sets of sub entities by assigning a weight value to each split set of sub entities.

In further example embodiments of the present invention, the predetermined threshold value corresponds to a maximum bank width.

In example embodiments of the present invention, the weight function determines an order of the split sets of sub entities according to the assigned weight values and an applied packing method is picking up the split sets of sub entities according to the order and determines in which bank a current split set of sub entities is placed in.

In example embodiments of the present invention, the packing method uses a first-fit-algorithm and/or a best-fit-algorithm and/or a next-fit-algorithm.

In example embodiments of the present invention, the data are compressed data representing a data table as data entity having columns as sub entities.

In example embodiments of the present invention, all packed data columns in a bank are processed all at once in a same number of instructions.

In example embodiment of the present invention, a computer system comprises at least one computer and at least one storage media for storing a database, where the at least one computer comprises at least one processor unit, a bus structure, at least one memory with a query manager and/or a data manager for performing the computerized method for processing data according.

In another example embodiment of the present invention, a data processing program for execution in a data processing system comprises software code portions for performing a method for processing data when the program is run on the data processing system.

In yet another example embodiment of the present invention, a computer program product stored on a computer-usable medium, comprises computer-readable program means for causing a computer to perform a method for processing data when the program is run on the computer.

The example embodiments of the present invention disclosed herein can be bin-packing compressed data columns provided in fixed-length data banks by gathering the columns that are frequently used together into the same bank. The resulting data banks can be used to achieve faster table scan speed in query processing.

Thus, a method of bin-packing compressed data columns in fixed length data banks is provided for fast query processing using table scans. This facilitates a reduction in the average number of relevant banks for the queries, i.e. the banks that are accessed together. In contrast to known methods, like first-fit, best-fit, next-fit, which do not apply information about column usage (they simply pack the columns to banks using a predefined usage independent logic), the present invention analyzes existing queries to derive knowledge about the usage patterns of data columns, i.e. columns that are frequently referenced together in the same query, and applies a heuristic to bin-pack them into the same banks. The knowledge about the usage patterns may be derived from statistics information and thus improve the layout of bin-packing. Many different alternatives of the detailed procedure to apply this basic patent idea exist. The methods of the present invention are not limited to the specific bin-pack algorithm described. Different heuristics and approximation algorithms can be used to first bin-pack the columns in ultra-wide column sets and then the column sets.

While the described methods are for table scan with an emphasis on scanning, the present invention is not limited to such methods. The example embodiments of the present invention can benefit from overall processing including post processing steps, including grouping, aggregate, or simply result columns in the select clause. This might require an extension of the described method for processing compressed data with differentiated treatment of different types of columns, like select, predicate, group, aggregate, using e.g. different weighting.

Another possible embodiment is as follows: pack columns of same bit width into the same banks if possible. This is especially important with large word width and small itemsets, because the detriment for reading in large columns that are not needed when accessing a small column is reduced. Based on the same general idea, the method can also be extended in case of multiple bank widths, and to cases where duplication is allowed, i.e., a column can appear in multiple banks after bin-packing.

Embodiments of the present invention are particularly applicable for situations in which a significant portion of the queries possess common patterns of the referenced columns.

An example embodiment of the invention is now described with reference to the drawings, wherein like parts are designated by like numerals throughout. The following description is intended only by way of example, and simply illustrates certain select embodiments of devices, systems, and processes that are consistent with the invention as claimed herein.

Figure 1:
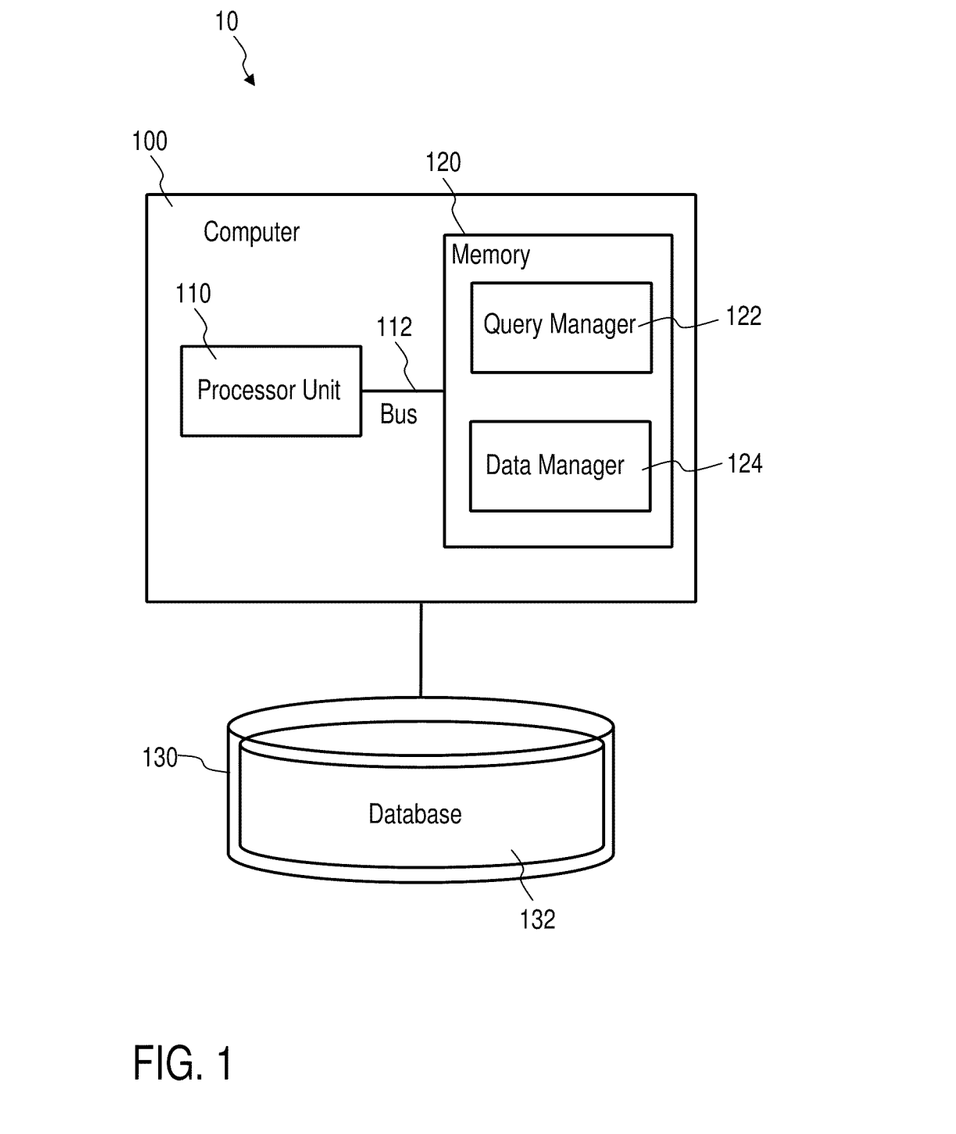
FIG. 1 is a schematic block diagram of a computer system, in accordance with an example embodiment of the present invention.
Figure 2:
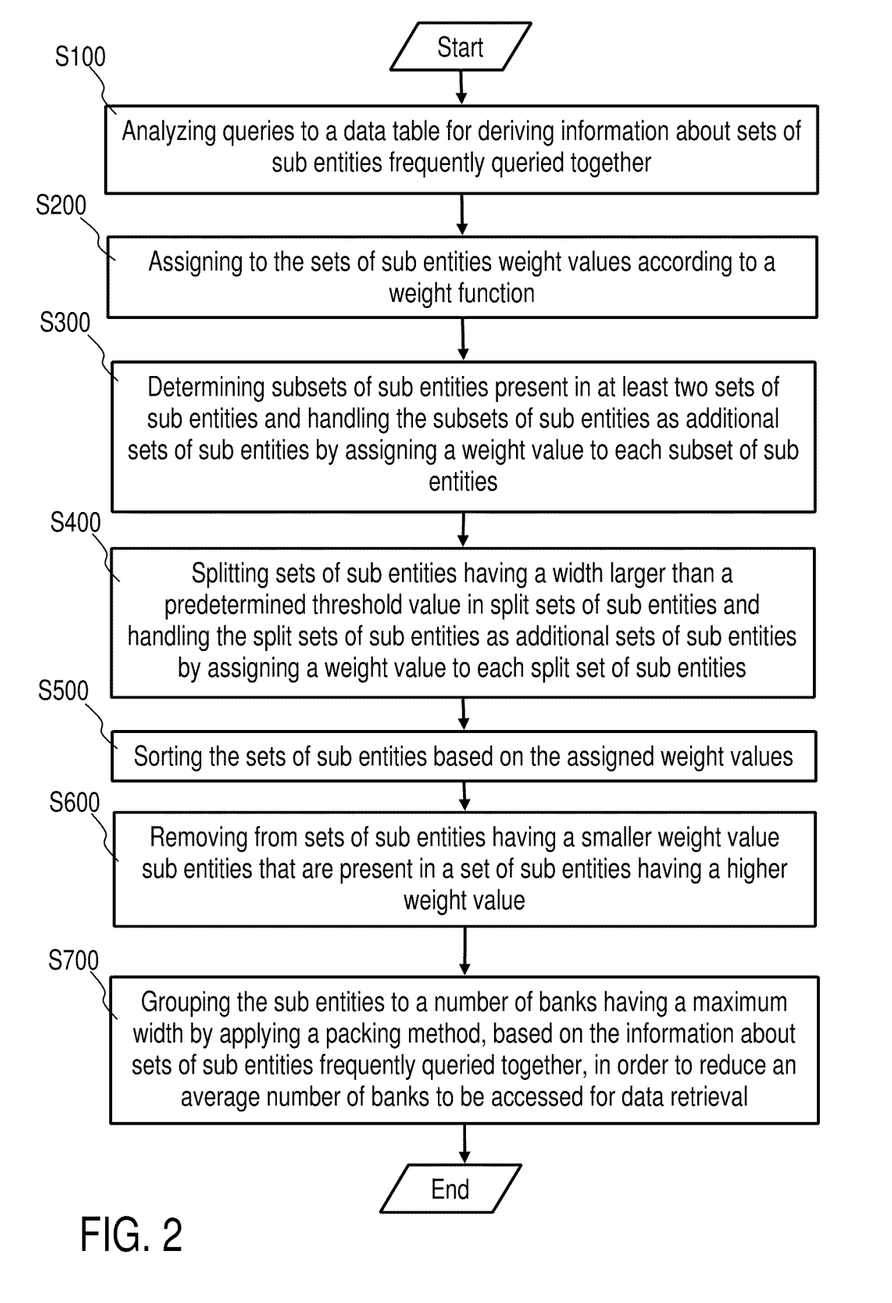
FIG. 2 is a schematic flow chart of a computerized method for processing data, in accordance with an example embodiment of the present invention.

FIG. 1 is a schematic block diagram of a computer system 1, in accordance with an embodiment of the present invention, and FIG. 2 is a flow chart of a computerized method for processing data, in accordance with an embodiment of the present invention, performed by the computer system 1.

Referring to FIG. 1, a computer system 10 comprises at least one computer 100 and at least one storage media 120, 130 for storing a database 132, where the at least one computer 100 comprises at least one processor unit 120, a bus structure 112, a least one memory 120 with a query manager 122 and/or a data manager 124 for performing the computerized method for processing data. In the shown embodiment the processed data are compressed data representing a data table as data entity having columns as sub entities. In alternative embodiments of the present invention may also be applied to uncompressed data if they are naturally having an irregular number of bits less than the banks width.

Table scan sequentially processes all of the rows in the table to determine if they satisfy the selection criteria specified in a query. Despite its simplicity, it is especially suitable for the handling of unpredictable, ad-hoc queries that cannot be practically assisted by appropriate tuning techniques, such as indexing. With the new trend of in-memory databases and column-oriented store and operational data warehouses, table scan plays a more and more important role in fast processing of queries.

Table scan is intensive in both central processing unit (CPU) and Input/Output (I/O) performance, i.e. in computation and data transfer. Often, massive parallel processing is used to cope with the CPU intensiveness. In order to alleviate the I/O bottleneck, compression is often applied to the data columns in the table. Various compression techniques are employed, which effectively translates the original column value that occupies several bytes with a code of only several bits. For the sake of efficiency in both storage and processing, the compressed column codes of tuples are usually packed into banks with fixed width corresponding to that of the local registers.

Figure 3:
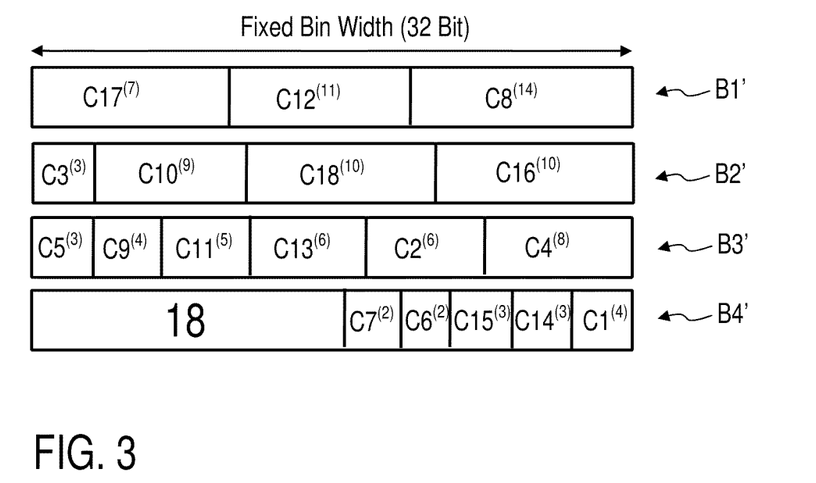
FIG. 3 is an example of a bank layout as result of a known method for processing data.

FIG. 3 illustrates an example of bin-packing 18 compressed columns C1 with 4 bits, C2 with 6 bits, C3 with 3 bits, C4 with 8 bits, C5 with 3 bits, C6 with 2 bits, C7 with 2 bits, C8 with 14 bits, C9 with 4 bits, C10 with 9 bits, C11 with 5 bits, C12 with 11 bits, C13 with 6 bits, C14 with 3 bits, C15 with 3 bits, C16 with 10 bits, C17 with 7 bits and C18 with 10 bits into four banks B1', B2', B3', B4' with a fixed length of 32 bits.

The search of best bin-packing is known to be NP hard. Therefore, heuristics are usually applied. One of the most common heuristics is the first-fit algorithm, which is a greedy algorithm that iterates over the items to be packed and scans all exiting bins and places an item in the first bin large enough to hold it. When no bin is large enough, a new bin will be created. By first sorting the list of elements into decreasing order, this algorithm works more efficiently. Let M be the optimal number of bins required to pack a list of items, it is proven that a first fit decreasing algorithm never uses more than (11/9)*M+4 bins in off-line mode. The banks B1', B2', B3', B4' in FIG. 3 are the result of applying first-fit heuristic to the original set of compressed data.

By bin-packing compressed data columns C1 to C18 in the above manner, a typical data base row will span multiple banks B1', B2', B3', B4'. When applying a query using table scan on the compressed table, all relevant banks B1', B2', B3', B4' will be loaded in memory or already kept in memory, where relevant means that the banks B1', B2', B3', B4' contain columns C1 to C18 that are referenced by the query. In particular, each relevant bank B1', B2', B3', B4' that contains predicate columns will be scanned separately. Therefore, the number of relevant banks B1', B2', B3', B4' is an important factor that influences the speed of table scan.

Therefore, instead of merely optimizing for the minimum number of banks B1', B2', B3', B4', it is desirable to bin-pack the compressed columns C1 to C18 in a way that reduces the average number of relevant banks B1', B2', B3', B4' for the queries.

Figure 4:
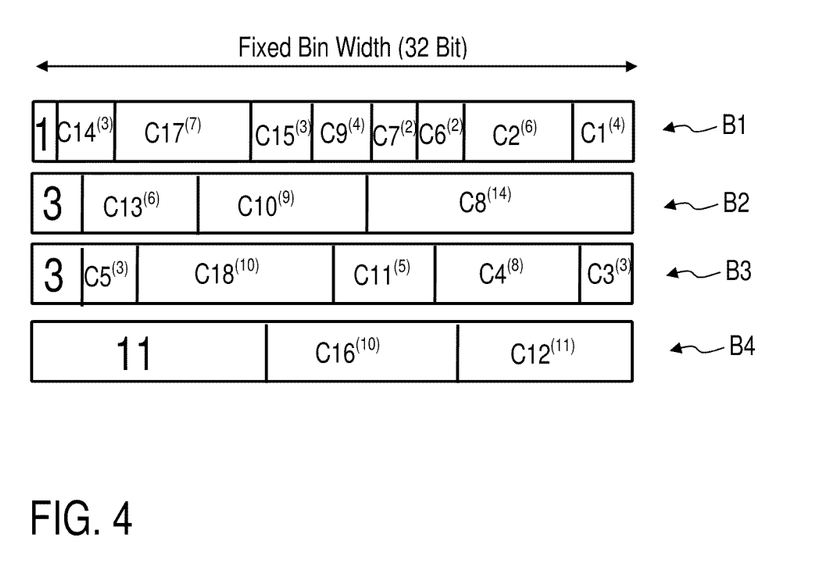
FIG. 4 is an example of a bank layout as result of a method for processing data; in accordance with an example embodiment of the present invention.

An example embodiment of the present invention comprises a method of bin-packing compressed data columns in fixed-length data banks B1, B2, B3, and B4 for fast query processing using table scans. The average number of relevant banks B1, B2, B3, and B4 is reduced for the queries. The basic idea is to analyze existing queries to derive knowledge about the usage patterns of data columns C1 to C18, i.e. columns C1 to C18 that are frequently referenced together in the same query, and apply a heuristic to bin-pack them into the same banks B1, B2, B3, B4.

The steps of this method are described using the same example as FIG. 3 to illustrate how this method can result into a better layout of the compressed columns C1 to C18 in banks B1, B2, B3, and B4. Variances of the exact method can exist, for example the exact sequences of different steps can be adjusted.

Usage pattern is a collection of relevant column sets S1 to S5 and the relative weight of each column set S1 to S5. A number of historical or typical queries are needed to acquire enough knowledge of the usage pattern toward which the layout of the bin-packed columns C1 to C18 in the banks B1, B2, B3, and B4 is optimized.

The exact definition of relevant column sets S1 to S5 and the relative weight varies, depending on the level of details to capture. In its simplest form, the relevant column set S1 to S5 is defined as the set of columns S1 to S5 that are tested in the same query, and the relative frequency of each column set S1 to S5 can be used as the weight. In a more complex scenario, the relative weight can be defined as the frequency multiplied by the amount of time needed for processing that query.

TABLE 1

A simplified example of relevant column set table, wherein the column sets comprise selected compressed data columns form the compressed data columns C1 to C18.

| Relevant Column Set | Occurrences | Weight (Frequency) |
|---|---|---|
| C3, C4, C6, C15, C17 | 1200 | 0.3 |
| C1, C2, C6, C7, C9, C15, C17 | 1200 | 0.3 |
| C1, C2, C6, C7, C8, C10, C15, C17 | 800 | 0.2 |
| C1, C2, C6, C7 | 400 | 0.1 |
| C2, C5, C8, C11, C15, C16, C18 | 400 | 0.1 |

Table 1 provides an example of identifying workload patterns using the simplest form. For each query, its relevant column set is recorded in a table, and the number of occurrences is increased. In the shown embodiment a first set S1 of columns comprises the columns C3, C4, C6, C15 and C17, a second set S2 of columns comprises the columns C1, C2, C6, C7, C9, C15 and C17, a third set S3 of columns comprises the columns C1, C2, C6, C7, C8, C10, C15 and C17, a fourth set S4 of columns comprises the columns C1, C2, C6 and C7, and a fifth set S5 of columns comprises the columns C2, C5, C8, C11, C15, C16 and C18. Finally, at the end of usage pattern collection, the relative frequency of each column set S1 to S5 will be calculated as the weight of the column set S1 to S5. In the given example the column set table contains five relevant column sets, with relative frequency from 30% to 10%, wherein the sum is 100%. The table is sorted in a descending manner according to the weight, which in this simple example is the frequency.

There are cases in which some column sets each appear less frequent, but they share some common columns that are frequent. It can be advantageous to detect such common columns to avoid them being allocated in separate banks.

Pre-processing can be optionally applied on the recorded relevant column set table to resolve overlapping columns, i.e. a subset Sub1 to Sub5 of columns C1 to C18 contained in multiple column sets S1 to S5. Standard frequent item set algorithms in association rule data mining, e.g. the famous Apriori algorithm, can be used to determine the frequent item sets. The resulting overlapping column subsets Sub1 to Sub5 are listed as additional items in the column set table.

Since the frequency of each subset Sub1 to Sub5 is the sum of the frequencies of the overlapping column sets S1 to S5, the frequency of the subset Sub1 to Sub5 will always be larger than those of the overlapping column sets S1 to S5. Therefore, the impact of such pre-processing can be two-fold. On the one hand, it will reduce the possibility that the included columns in the common subset are already allocated in different banks B1, B2, B3, and B4. On the other hand, separating the subset Sub1 to Sub5 from the original column sets S1 to S5 can result into the subset Sub1 to Sub5 allocated into a different bank B1, B2, B3, and B4 as the remaining columns. Therefore, this pre-processing is optional, and should be applied as appropriate.

For our previous example, table 2 presents the resulting usage pattern table after resolving overlapping. The common appearing column subsets Sub1 to Sub5, in italic font, are appended separately to the table.

TABLE 2

Column set table after resolving overlapping columns

| Relevant Column Set | Width (Bits) | Weight (Freq.) |
|---|---|---|
| C3, C4, C6, C15, C17 | 22(3 + 8 + 2 + 3 + 7) | 0.3 |
| C1, C2, C6, C7, C9, C15, C17 | 23(4 + 6 + 2 + 2 + 4 + 3 + 7) | 0.3 |
| C1, C2, C6, C7, C8, C10, C15, C17 | 28(4 + 6 + 2 + 2 + 14 + 9 + 3 + 7) | 0.2 |
| C1, C2, C6, C7 | 14(4 + 6 + 2 + 2) | 0.1 |
| C2, C5, C8, C11, C15, C16, C18 | 51(6 + 3 + 14 + 5 + 3 + 10 + 10) | 0.1 |
| *C1, C2, C6* | *12(4 + 6 + 2)* | *0.6* |
| *C6, C15, C17* | *12(2 + 3 + 7)* | *0.8* |
| *C1, C2, C6, C7* | *14(4 + 6 + 2 + 2)* | *0.6* |
| *C2, C15* | *9(6 + 3)* | *0.6* |
| *C1, C2, C6, C7, C15, C17* | *13(4 + 6 + 2 + 2 + 3 + 7)* | *0.5* |

It should be noted that the overlapping subsets Sub1 to Sub5 are preserved from the original column sets S1 to S5 at this step. The relative sequence will be adjusted, and removing the overlapping will finally be removed later. In the shown embodiment a first subset Sub1 of columns comprises the columns C1, C2, C6, a second subset Sub2 of columns comprises the columns C6, C15, C17, a third subset Sub3 of columns comprises the columns C1, C2, C6, C7, a fourth subset Sub4 of columns comprises the columns C2, C15, and a fifth subset Sub5 of columns comprises the columns C1, C2, C6, C7, C15, C17.

For any column set that exceeds the bank width, it is necessary to split that column set into multiple smaller column split sets Split1, Split2. This is done by "bin-packing" the columns contained in the column set into the banks. Different existing bin-packing heuristics can be applied. In the shown embodiment the column set is split in two split sets only although the number of splits is not limited to two.

In the example, the width of the targeting banks B1, B2, B3, and B4 is chosen as the width of banks for this "pre-" bin-packing step. Actually, the width of bins in this "pre-" bin-packing step can either be equal or less than the width of the targeting banks B1, B2, B3, and B4.

In the previous example, the set S5 with the columns C2, C5, C8, C11, C15, C16, and C18 has a width of 51 bits (6+3+14+5+3+10+10). Using first-fit heuristic, it can be bin-packed into two banks of 32 bits, where a first column split set Split1 contains columns C2, C8, C16 and a second column split set Split2 contains columns C5, C11, C15, C18. The resulting column set table after splitting the ultra-wide column set 55 is presented in Table 3.

Common bin-packing heuristics sort the individual columns in decreasing order of column width for easier placement of large items. To bin-pack column sets S1 to S5, the criteria of sorting should also cover the weight, which inherently cover frequency, of each column set S1 to S5, and the number of columns in each column set (#column).

TABLE 3

Column set table with split ultra-wide column sets sorted according to width * weight * columns values

| Relevant Column Set | Columns | Width (Bits) | Weight (Freq.) | Width * Weight * Columns |
|---|---|---|---|---|
| C1, C2, C6, C7, C9, C15, C17 | 7 | 23 (4 + 6 + 2 + 2 + 4 + 3 + 7) | 0.3 | 58.8 |
| C1, C2, C6, C7, C8, C10, C15, C17 | 8 | 28 (4 + 6 + 2 + 2 + 14 + 9 + 3 + 7) | 0.2 | 44.8 |
| C1, C2, C6, C7, C15, C17 | 6 | 13 (4 + 6 + 2 + 2 + 3 + 7) | 0.5 | 39.0 |
| C1, C2, C6, C7 | 4 | 14 (4 + 6 + 2 + 2) | 0.6 | 33.6 |
| C3, C4, C6, C15, C17 | 5 | 22 (3 + 8 + 2 + 3 + 7) | 0.3 | 33.0 |
| C6, C15, C17 | 3 | 12 (2 + 3 + 7) | 0.8 | 28.8 |
| C1, C2, C6 | 3 | 12 (4 + 6 + 2) | 0.6 | 21.6 |
| C2, C15 | 2 | 9 (6 + 3) | 0.6 | 10.8 |
| C2, C8, C16 | 3 | 30 (6 + 14 + 10) | 0.1 | 9.0 |
| C5, C11, C15, C18 | 4 | 21 (3 + 5 + 3 + 10) | 0.1 | 8.4 |
| C1, C2, C6, C7 | 4 | 14 (4 + 6 + 2 + 2) | 0.1 | 5.6 |

In general, this is to define weight function F (width, weight, # columns) that is quasi-proportional to width, weight and the number of columns, and sort the columns and column sets S1 to S5, Sub1 to Sub5, Split1, Split2 according to the weight function F in decreasing order. A simple definition of such functions is as weight*width*# columns. For the previous example, Table 3 presents the resulting usage pattern table after sorting.

Repeating columns in the sorted list of column sets S1 to S5, Sub1 to Sub5, Split1, Split2 and columns can be removed at this point of time. The first occurrence of each column is preserved, and subsequent repeated occurrences are deleted. Once the repeated columns are removed, the table can be sorted again. The resulting column set table for the example is shown in Table 4.

TABLE 4

Column set table with marked repeats sorted according width * weight * columns values

| Relevant Column Set | Columns | Width (Bits) | Weight (Freq.) | Width * Weight * Columns |
|---|---|---|---|---|
| C1, C2, C6, C7, C9, C15, C17 | 7 | 23 (4 + 6 + 2 + 2 + 4 + 3 + 7) | 0.3 | 58.8 |
| C8, C10 | 2 | 23 (14 + 9) | 0.2 | 9.2 |
| C3, C4 | 2 | 11 (3 + 8) | 0.3 | 6.6 |
| C5, C11, C18 | 3 | 18 (3 + 5 + 10) | 0.1 | 5.4 |
| C16 | 1 | 10 (10) | 0.1 | 1.0 |

Another step of the clean-up process is to append unreferenced columns to the end of the column set table, sorting the columns in decreasing order according to width. For the previous example, Table 5 presents the column set table after the clean-up.

TABLE 5

Column set table after appending unreferenced columns to the end of the column set table

| Relevant Column Set | Columns | Width (Bits) | Weight (Freq.) | Width * Weight * Columns |
|---|---|---|---|---|
| C1, C2, C6, C7, C9, C15, C17 | 7 | 23 (4 + 6 + 2 + 2 + 4 + 3 + 7) | 0.3 | 58.8 |
| C8, C10 | 2 | 23 (14 + 9) | 0.2 | 9.2 |
| C5, C11, C18 | 3 | 18 (3 + 5 + 10) | 0.1 | 5.4 |
| C3, C4 | 2 | 11 (3 + 8) | 0.3 | 6.6 |
| C12 | 1 | 11 | 0.0 | N/A |
| C16 | 1 | 10 (10) | 0.1 | 1.0 |
| C13 | 1 | 6 | 0.0 | N/A |
| C14 | 1 | 3 | 0.0 | N/A |

Based on the collected usage patterns of data columns C1 to C18 and the sorted element sets S1 to S5, Sub1 to Sub5, Split1, Split2, heuristics can be applied to bin-pack the column sets S1 to S5, Sub1 to Sub5, Split1, Split2 and columns C1 to C18 into banks B1, B2, B3, B4.

Various heuristics using first-fit, best-fit, next-fit algorithms and so on can be applied, provided that a column set is treated like a column as a unit. The sequence of column sets and columns should be respected when picking up the next item.

An example of bin-packing the column sets and columns using first-fit heuristic is shown in FIG. 4. For the same set of compressed columns C1 to C18 in FIG. 3, a different bank layout results. For the same set of queries used in previous queries, the average number of banks B1, B2, B3, B4 that have to be scanned per query is reduced from 3.9 as is seen in Table 6, to 2.2 in Table 7. This corresponds to approximately 70% speed up.

TABLE 6

Average number of banks per query with the original bank layout, shown in FIG. 3.

| Relevant column set | Weight (Freq.) | #Banks | Weight * #Banks |
|---|---|---|---|
| C3, C4, C6, C15, C17 | 0.3 | 4 | 1.2 |
| C1, C2, C6, C7, C9, C15, C17 | 0.3 | 4 | 1.2 |
| C1, C2, C6, C7, C8, C10, C15, C17 | 0.2 | 4 | 0.8 |
| C1, C2, C6, C7 | 0.1 | 3 | 0.3 |
| C2, C5, C8, C11, C15, C16, C18 | 0.1 | 4 | 0.4 |
| Sum | 1.0 | | 3.9 |

TABLE 7

Average number of banks per query with the optimized bank layout, shown in FIG. 4.

| Relevant column set | Weight (Freq.) | #Banks | Weight * #Banks |
|---|---|---|---|
| C3, C4, C6, C15, C17 | 0.3 | 2 | 0.6 |
| C1, C2, C6, C7, C9, C15, C17 | 0.3 | 1 | 0.3 |
| C1, C2, C6, C7, C8, C10, C15, C17 | 0.2 | 2 | 0.8 |
| C1, C2, C6, C7 | 0.1 | 1 | 0.1 |
| C2, C5, C8, C11, C15, C16, C18 | 0.1 | 4 | 0.4 |
| Sum | 1.0 | | 2.2 |

The resulting bank layout can be a little bit less compact than simpler heuristics that apply full sorting. For the first-fit heuristic with full decreasing sorting can achieve no more than (11/9)*OPT+1bins, where OPT is the number of bins given by the optimal solution, and without full sorting is only (17/10)*OPT+2. Embodiments of the present invention with partial sorting of columns in extra-wide column sets and full sorting of column sets, are expected with a compactness to be somewhere in between.

Referring to FIG. 2, a flowchart depicts how the computer system 10 performs the method for processing data representing a data entity having sub entities C1 to C18. After an initialization the query manager 122 analyzes queries to the data entity for deriving information about sets S1 to S5 of the sub entities C1 to C18 frequently queried together in step S100. In step S200 the sets S1 to S5 of the sub entities C1 to C18 are assigned to weight values according to the weight function F. In step S300 subsets Sub1 to Sub5 of sub entities C1 to C18 present in at least two sets S1 to S5 of sub entities C1 to C18 are determined and handled as additional sets of sub entities C1 to C18 by assigning a weight value to each subset Sub1 to Sub5 of sub entities. In step S400 sets S1 to S5 of sub entities C1 to C18 having a width larger than a predetermined threshold value are split in split sets Split1, Split2 of sub entities C1 to C18 and handled as additional sets of sub entities C1 to C18 by assigning a weight value to each split set Split1, Split2 of sub entities C1 to C18. In step S500 the sets S1 to S5, Sub1 to Sub5, Split1, and Split2 of sub entities C1 to C18 are sorted based on the weight values. In step S600 sub entities C1 to C18 that are present in a set S1 to S5, Sub1 to Sub5, Split1, Split2 of sub entities C1 to C18 having a higher weight value are removed form sets S1 to S5, Sub1 to Sub5, Split1, Split2 of sub entities C1 to C18 having a smaller weight value. In step S700 the sub entities C1 to C18 are grouped to a number of banks B1, B2, B3, B4, each bank B1, B2, B3, B4 having a maximum width, based on the information about sets S1 to S5 of sub entities C1 to C18 frequently queried together, in order to reduce an average number of banks B1, B2, B3, B4 to be accessed for data retrieval.

The computer implemented method in accordance with the invention for processing data, especially compressed data, can be implemented as an entirely software embodiment, or an embodiment containing both hardware and software elements. In an example embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Although some specific embodiments of the present invention have been demonstrated in detail as examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

What is claimed:

1. A computer implemented method for processing data representing a data table comprising columns, said method comprising:
    analyzing, via a processor, queries to said data table for deriving access frequency information about a plurality of sets, each set comprising two or more of the columns accessed together by a corresponding query;
    assigning weight values to said sets of columns, the weight values being dependent at least upon the access frequencies of the sets of columns;
    determining subsets of columns present in at least two of columns, and handling said subsets of columns as additional sets of columns by assigning a weight value to each subset of columns, wherein the assigned weight value is a function of previously assigned weight values;
    determining criteria values based at least upon the weights of the sets of columns;
    splitting sets of columns having a width larger than a maximum bank width value in split sets of columns and handling said split sets of columns as additional sets of columns by assigning a criteria value to each split set of columns;
    sorting said sets of columns based on said criteria values;
    removing columns that are present in multiple sets of columns from sets of columns having a smaller criteria values;
    handling columns of said data table not present in any set of columns as individual columns having a low criteria value; and
    grouping, via a processor, said columns to a number of banks, with each bank having a maximum width and at least one of the sets of two or more columns, wherein said grouping reduces an average number of banks to be accessed for data retrieval and comprises a packing method comprising iterating over the sets of columns in sorted order and for each set of columns;
        scanning one or more banks and grouping the set of columns to a first bank having space to hold the set of columns, wherein, when the one or more banks lacks a bank having space to hold the set of columns, a new bank is added, and the set of columns is grouped to the new bank.

2. The method of claim 1, wherein said maximum width has a size of a CPU register.

3. The method of claim 1, further comprising:
    removing columns that are present in multiple sets of columns from sets of columns having a smaller criteria values.

4. The method of claim 1, wherein said criteria values increase with at least one of: total width of said set of columns, access frequency of said set of columns, number of columns in said set of columns, and processing time of said queries to said data table comprising said sets of columns.

5. The method of claim 1, wherein an access frequency of each subset of columns is determined as a sum of said access frequencies of corresponding sets of columns containing said subset.

6. The method of claim 1, wherein all packed data columns in a bank are processed all at once in a same number of instructions.

7. A computer system comprising at least one computer and at least one storage media to store a database, wherein said at least one computer comprises at least one processor configured to process data representing a data table comprising columns by:
- analyzing, via a processor, queries to said data table for deriving access frequency information about a plurality of sets, each set comprising two or more of the columns accessed together by a corresponding query;
- assigning weight values to said sets of columns, the weight values being dependent at least upon the access frequencies of the sets of columns;
- determining subsets of columns present in at least two of columns, and handling said subsets of columns as additional sets of columns by assigning a weight value to each subset of columns, wherein the assigned weight value is a function of previously assigned weight values;
- determining criteria values based at least upon the weights of the sets of columns;
- splitting sets of columns having a width larger than a maximum bank width value in split sets of columns and handling said split sets of columns as additional sets of columns by assigning a criteria value to each split set of columns;
- sorting said sets of columns based on said criteria values;
- removing columns that are present in multiple sets of columns from sets of columns having a smaller criteria values;
- handling columns of said data table not present in any set of columns as individual columns having a low criteria value; and
- grouping, via a processor, said columns to a number of banks, with each bank having a maximum width and at least one of the sets of two or more columns, wherein said grouping reduces an average number of banks to be accessed for data retrieval and comprises a packing method comprising iterating over the sets of columns in sorted order and for each set of columns:
  - scanning one or more banks and grouping the set of columns to a first bank having space to hold the set of columns, wherein, when the one or more banks lacks a bank having space to hold the set of columns, a new bank is added, and the set of columns is grouped to the new bank.

8. A computer program product for processing data representing a data table comprising columns, the computer program product comprising a computer readable storage medium, the computer readable storage medium having a computer readable program code embodied therewith, the computer readable program code configured to:
- analyze, via a processor, queries to said data table for deriving access frequency information about a plurality of sets, each set comprising two or more of the columns accessed together by a corresponding query;
- assign weight values to said sets of columns, the weight values being dependent at least upon the access frequencies of the sets of columns;
- determine subsets of columns present in at least two of columns, and handling said subsets of columns as additional sets of columns by assigning a weight value to each subset of columns, wherein the assigned weight value is a function of previously assigned weight values;
- determine criteria values based at least upon the weights of the sets of columns;
- split sets of columns having a width larger than a maximum bank width value in split sets of columns and handle said split sets of columns as additional sets of columns by assigning a criteria value to each split set of columns;
- sort said sets of columns based on said criteria values;
- remove columns that are present in multiple sets of columns from sets of columns having a smaller criteria values;
- handle columns of said data table not present in any set of columns as individual columns having a low criteria value; and
- group, via a processor, said columns to a number of banks, with each bank having a maximum width and at least one of the sets of two or more columns, wherein said grouping reduces an average number of banks to be accessed for data retrieval and comprises a packing method comprising iterating over the sets of columns in sorted order and for each set of columns:
- scanning one or more banks and grouping the set of columns to a first bank having space to hold the set of columns, wherein, when the one or more banks lacks a bank having space to hold the set of columns, a new bank is added, and the set of columns is grouped to the new bank.

* * * * *